March 17, 1942.   C. B. MOORE   2,276,506
MEASURING AND CONTROL APPARATUS
Filed Jan. 3, 1940
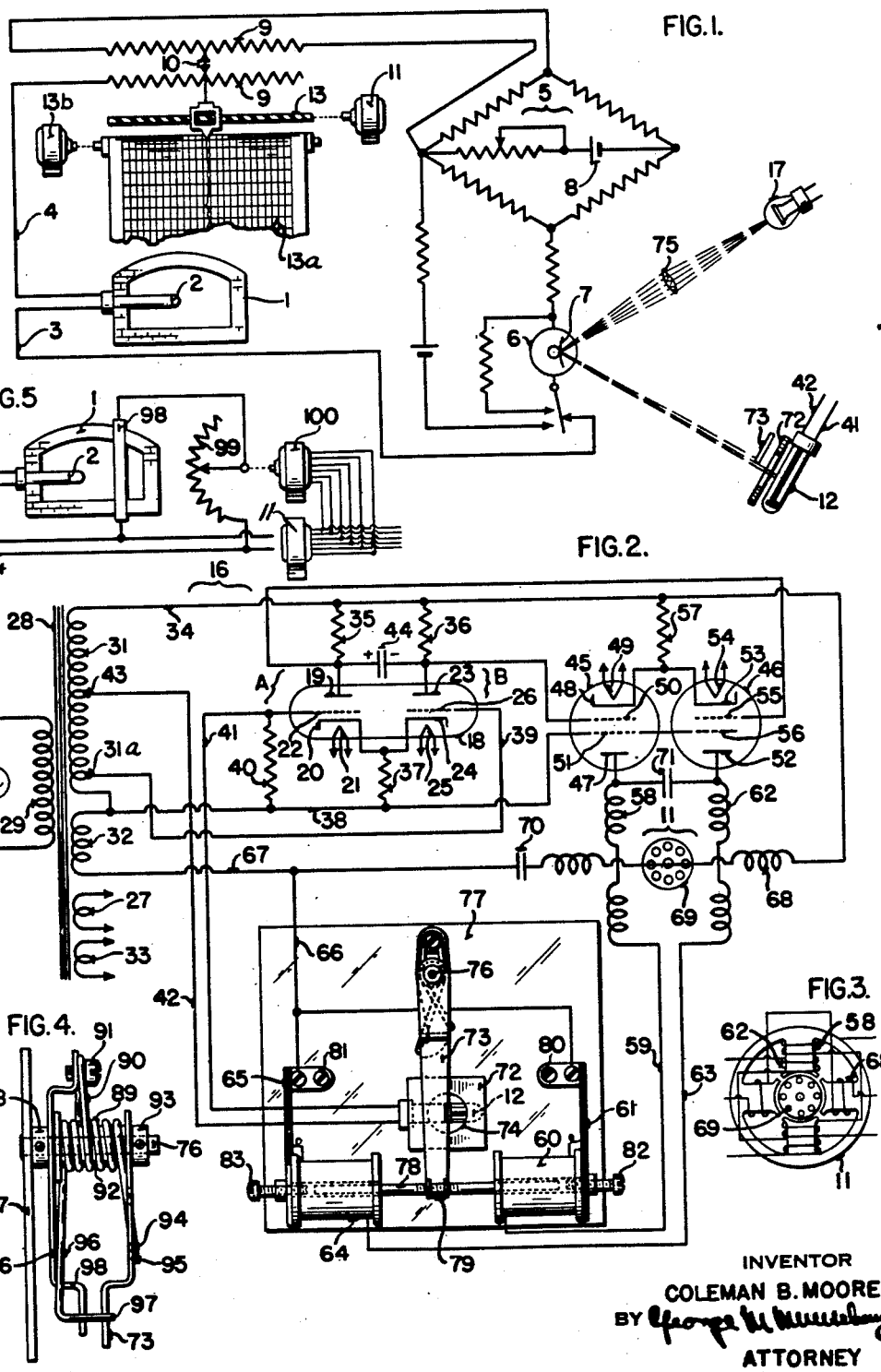
INVENTOR
COLEMAN B. MOORE
BY
ATTORNEY Patented Mar. 17, 1942

2,276,506

UNITED STATES PATENT OFFICE 2,276,506

MEASURING AND CONTROL APPARATUS

Coleman B. Moore, Carroll Park, Pa., assignor to The Brown Instrument Company, Philadelphia, Pa., a corporation of Pennsylvania Application January 3, 1940, Serial No. 312,304

12 Claims. (Cl. 250—41.5)

The present invention relates to instrumentalities useful in measuring and/or controlling a variable condition, and more particularly relates to measuring and/or controlling apparatus adapted to produce effects in accordance with the deflection of a sensitive measuring element which controls the apparatus and deflects in accordance with variations in a control quantity or in a quantity to be measured, and in which because of the small magnitude of the element deflecting force it is not desirable, nor feasible, to have the said effects directly produced by the deflecting element.

An object of the invention is to provide a sensitive and extremely stable measuring instrument in which an element deflecting in accordance with changes in the value of a quantity to be measured is employed to control the illumination of a light sensitive device and thereby the operation of an electronic relay mechanism which is adapted to adjust the recording pen, indicating pointer or other exhibiting part of the instrument.

Another object of the invention is to provide a measuring and/or controlling instrument which is quick in its action and does not overrun or hunt and is adapted to produce the desired recording and/or controlling effects in response to small deflections of the most sensitive measuring instruments.

A further object of the invention is to provide a measuring and/or controlling instrument wherein simple and efficient means auxiliary to the basic measuring and/or controlling apparatus are provided to minimize the tendency of the instrument to overrun or hunt.

Another object of the invention is to provide a measuring and/or controlling instrument embodying means to prevent overrunning or hunting thereof wherein the controlling force exerted by said means upon the operation of the instrument is a function of the operation of said instrument.

In an embodiment of the present invention, an element deflecting in accordance with variations in a condition under measurement is employed to control the illumination of a photoelectric cell and the latter, in turn, is adapted to selectively control the rotation and direction of rotation of a reversible electrical motor in accordance with the extent to which it is illuminated. In order that the response of the motor to changes in the deflection of said deflecting element may be suitably sharp, an arrangement comprising a beam of light and an opaque shield are so positioned with respect to said photoelectric cell and deflecting element that when the latter is in its normal undeflected position the photoelectric cell will be illuminated to a predetermined degree and upon slight deflection of the deflecting element in one direction or the other from its normal position, the illumination of the photoelectric cell will be either completely cut off or materially increased. When the illumination of the photoelectric cell is so controlled and the light beam is suitably narrow it will be apparent that the reversible motor will be sharply controlled for rotation in one direction or the other in response to minute deflections of the sensitive measuring element and may be employed to effect a follow-up or rebalancing adjustment of the measuring system for restoring the illumination of the photoelectric cell to a predetermined normal value.

In accordance with the present invention the energization of the motor is so controlled that its speed will be proportional or substantially so, to the extent to which the sensitive deflecting element has departed from its normal position. When the motor is so operated its speed of rotation will be great when the deflection of the sensitive deflecting element is great, and its speed will decrease in accordance with the decrease in deflection of the sensitive deflecting element whereby the motor will come to rest at the precise position in which the illumination of the photoelectric cell is a predetermined, normal value. According to the present invention, the energization of the motor is interrupted by a novel arrangement described hereinafter, and the rate of interruption is inversely proportional to the magnitude of the deflection of the deflecting element from its normal position so that the speed of the motor will be great when the sensitive element deflection is great and correspondingly reduced when the deflection thereof is reduced and is also a function of the duration of the motor energization.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention.

Of the drawing:

Fig. 1 is a diagrammatic view illustrating one embodiment of the invention as adapted for use in measuring and recording the temperature in a furnace;

Fig. 2 illustrates in detail a controlling circuit for the rebalancing motor of the Fig. 1 arrangement and embodying a preferred form of the novel anti-hunting arrangement of my invention;

Fig. 3 is a diagrammatic view of the reversible motor of Figs. 1 and 2;

Fig. 4 is a detailed view of a portion of my novel anti-hunting arrangement shown in Fig. 2; and Fig. 5 is a diagrammatic view illustrating the use of the apparatus in a control system.

In Fig. 1 of the drawing I have illustrated, more or less diagrammatically, a pyrometer for measuring and recording the temperature of the interior of a furnace 1. As illustrated a thermocouple 2 is arranged in the interior of the furnace and the terminals of the thermocouple are connected by conductors 3 and 4 to the terminals of a null point potentiometric network 5 which may be of any suitable type such as the Brown potentiometric network disclosed in Patent 1,898,124, issued February 21, 1933 to Thomas R. Harrison. The moving coil (not shown) of a galvanometer 6, which is of the deflecting type and equipped with a suitable mirror 7, is connected in the conductor 3. The rotation of the galvanometer moving coil is desirably restricted by mechanical stops (not shown).

The potentiometric network 5 is of a well known type, and, therefore, it is sufficient for the present purposes to note that the potentiometric network includes a circuit branch including the thermocouple 2, an opposing circuit branch including a source of known potential such as a battery 8, and resistors 9, a variable portion of which may be connected into the opposed branches by means of a sliding contact 10 whereby the respective effects of the variable and known sources are made equal and opposite, and the galvanometer moving coil is thus rendered undeflected when the circuit is balanced for a given value of electromotive force developed by the thermocouple 2 with the contact 10 in a corresponding position along resistors 9. The position of the contact 10 is then a measure of the value of the thermocouple electromotive force, and as will be clear, may serve as a measure of the temperature to which the thermocouple is exposed.

In the embodiment illustrated in the drawing, my invention is specifically concerned with the means by which the contact 10 is adjusted back and forth along resistors 9 in response to galvanometer deflection, and as shown in Fig. 1 includes a reversible electrical motor 11 the rotation and direction of rotation of which is adapted to be selectively controlled in accordance with the illumination of photoelectric cell 12. Motor 11 is connected in any convenient manner to contact 10 for adjusting the latter along resistors 9 and thereby effects rebalance of the potentiometric network 5 in response to a change in the electromotive force developed by the thermocouple 2. Specifically, the shaft of motor 11 is connected in any convenient manner to a screw shaft 13 and is adapted to adjust a carriage, on which the contact 10 is mounted, in one direction or the other along the length thereof as the shaft 13 is rotated.

The means by which the rotation and the direction of rotation of the reversible electrical motor 11 is selectively controlled in accordance with the deflection of galvanometer 6 are illustrated in detail in Fig. 2, and as shown, includes an electronic amplifier 16 to the input circuit of which the photoelectric cell 12 is connected and to the output circuit of which a pair of opposed energizing windings of motor 11 are connected. The photoelectric cell 12 is preferably mounted in a casing (not shown) so as to be shielded from all external light except that emanating from a lamp 17, as seen in Fig. 1, and directed thereon by the galvanometer mirror 7, and is adapted to selectively control the flow of electric energizing current to the said opposed windings of motor 11.

The electronic amplifier 16 referred to includes an electronic valve 18, which as shown, is a twin amplifier type including two triodes in one envelope. For convenience of illustration the triodes of valve 18 have been designated by the references symbols A and B respectively. The triode A includes an anode 19, a cathode 20 and heater filament 21, and a control grid 22, and triode B includes an anode 23, a cathode 24 and heater filament 25, and a control grid 26. The heater filaments 21 and 25 of triodes A and B are connected in parallel and receive energizing current through conducting leads (not shown) from the secondary winding 27 of a transformer 28 having a line voltage primary winding 29 the terminals of which are connected to an alternating current supply source 30, and secondary windings 31, 32 and 33.

Anode voltage is supplied both triode sections of valve 18 from the transformer secondary winding 31 through a circuit which may be traced from the upper terminal of winding 31, as seen in Fig. 2, to a conductor 34, to a parallel circuit including in one branch a resistance 35 and the anode to cathode resistance of the triode A and including in the other branch a resistance 36 and the anode to cathode resistance of triode B, to a cathode biasing resistance 37 and a conductor 38 to the lower terminal of winding 31.

As shown, the control grid 26 of triode B is connected by a conductor 39 having low resistance to a point 31a on the transformer secondary winding and therethrough to the lower terminal of resistance 37, and the control electrode 22 of triode A is connected through a resistance 40 of suitable value directly to said terminal of biasing resistance 37. The control electrode 22 of triode A is also connected by a conductor 41 to the cathode of photoelectric cell 12, and the anode thereof is connected by a conductor 42 to a point 43 of suitable potential on the transformer secondary winding 31. Thus the conductivity of the triode B is adapted to remain substantially constant during the operation of the instrument, and the conductivity of the triode A is adapted to be increased and decreased with respect to the conductivity of the triode B in accordance with the illumination of the photoelectric cell 12. That is to say, when the illumination of the photoelectric cell is a predetermined, normal value, the conductivities of triodes A and B will be the same, and on an increase or decrease in the illumination of the photoelectric cell the conductivity of triode A will be increased and decreased, respectively, relatively to the conductivity of triode B.

The output circuits of the triodes A and B are coupled by the resistances 35 and 36 and a condenser 44, which is connected between the anodes of triodes A and B, to the input circuits of a pair of electronic valves 45 and 46. Valves 45 and 46 are heater type tetrodes, and as shown, valve 45 includes an anode 47, a cathode 48, a heater filament 49, a control grid 50 and a screen grid 51, and valve 46 includes an anode 52, a cathode 53, a heater filament 54, a control grid 55 and a screen grid 56. The heater filaments 49 and 54 of valves 45 and 46 may be connected in series or in parallel relation with each other and receive energizing current through conductors (not shown) from the transformer secondary winding 33. Anode voltage is supplied the valves 45 and 46 from the transformer secondary winding 31 and the transformer secondary winding 32, which as shown are connected in series relation, through a circuit which may be traced from the upper terminal of winding 31 to conductor 34, a cathode biasing resistance 57 to a parallel network including in one branch the anode to cathode resistance of valve 45, a winding 58 of motor 11, a conductor 59, a solenoid 60, and a bimetallic element 61 and including in the other branch the anode to cathode resistance of valve 46, a winding 62 of motor 11, a conductor 63, a solenoid 64, and a bimetallic element 65. The anode circuits of valves 45 and 46 are completed from bimetallic elements 61 and 65 by conductors 66 and 67 to the lower terminal of winding 32. The purpose of the solenoids 60 and 64 and the bimetallic elements 61 and 65 will be explained hereinafter.

It will be noted the valves 45 and 46 are connected in an inverse manner to the transformer secodary windings 31 and 32 with respect to the manner of connection of the anode circuits of the triodes A and B of valve 18 to the winding 31. Thus, valves 45 and 46 are adapted to be conductive during the half cycles of the alternating current voltage supplied by the windings 31 and 32 when the triodes A and B are non-conductive, and the conductivity of said valves are adapted to be controlled in accordance with the conductivities of the triodes A and B during the preceding half cycle. The condenser 44 connected between the anodes 19 and 23 of valve 18 is employed for this purpose, that is, to permit the selective control of the valves 45 and 46 in accordance with the conductivities of the triodes A and B during the preceding half cycle.

As illustrated more or less diagrammatically in Fig. 3, the motor 11 is of the induction variety and includes three windings, namely, the windings 58 and 62 and a winding 68, and a squirrel cage rotor 69 with which two pairs of oppositely disposed field poles are associated. Winding 68 is wound on one pair of said field poles and windings 58 and 62 are wound on the other pair of poles, one half of winding 58 being wound on a portion of one of the field poles which is adjacent the rotor 69, and the other half being wound on a portion of the other pole remote from said rotor. Similarly, one half of winding 62 is wound on a portion of the last mentioned pole adjacent the rotor 69, and the other half of winding 62 is wound on a portion of the first mentioned pole remote from said rotor.

As illustrated, winding 68 is connected to the transformer secondary windings 31 and 32 through a suitable condenser 70 so that the current which flows through this winding will lead the voltage supplied by windings 31 and 32 by approximately 90°. Winding 58 is energized by the current flow conducted by valve 45 and the third winding 62 is energized by the current flow conducted by valve 46. A condenser 71 of suitable value is connected between the anodes 47 and 52 of the valves 45 and 46, respectively. Windings 58 and 62 are so wound on motor 11 with respect to the manner in which winding 68 is wound thereon that when they are equally energized rotor 69 will not be actuated for rotation in either direction but will remain stationary. When one winding 58 or 62 is energized to a greater extent than the other, however, the rotor 69 will be actuated for rotation in a corresponding direction. That is to say, when the anode to cathode resistance of valve 45 is approximately equal to the anode to cathode resistance of valve 46, the torque developed by winding 58 for producing rotation of the rotor 69 will be equal and opposite to the torque developed by the winding 62 and, accordingly, the motor will remain stationary. When the anode to cathode resistance of one valve 45 or 46 is increased or decreased with respect to the other, however, the torque developed by winding 58 with respect to that developed by winding 62 will increase and decrease, respectively, and the motor will be actuated for rotation in a corresponding direction.

The manner in which the deflection of galvanometer 6 from its natural position operates to change the illumination of photoelectric cell 12 and thereby to selectively control the rotation and direction of rotation of the motor 11 is best described by considering Fig. 2 in connection with Fig. 1. As illustrated, a pair of shields 72 and 73 are arranged between the galvanometer mirror 7 and photoelectric cell 12 adjacent the latter. As seen in Fig. 2, shield 72 is in the form of a rectangular plate having a circular opening 74 through which a predetermined portion of the light reflected from lamp 17 by galvanometer mirror 7 is normally adapted to pass, the remainder being cut off by the shield 73. When the galvanometer mirror 7 is deflected in one direction, the light passing through the opening 74 will be increased and conversely, when the mirror 7 is deflected in the opposite direction the light therethrough will be completely cut off. It is noted that lamp 17 may be an electric lamp, or equivalent, and is disposed a suitable distance from mirror 7. Interposed between lamp 17 and mirror 7 is a lens 75 for converging the light rays from lamp 17 upon mirror 7.

It will thus be apparent that when the illumination of the photoelectric cell 12 is a predetermined, normal value, the conductivities of the triodes A and B of valve 18 will be the same, and as a result the conductivities of valves 45 and 46 will be the same whereby the rotor 69 of motor 11 will not be actuated for rotation in either direction but will remain stationary. When the illumination of the photoelectric cell 12 is increased or decreased, however, the conductivity of triode A will be correspondingly increased or decreased and accordingly the conductivity of valve 45 will be decreased or increased with respect to the conductivity of valve 46 and as a result rotation of rotor 69 of motor 11 will be produced in one direction or the other.

As noted hereinbefore, the shaft of motor 11 is connected in any convenient manner to the screw shaft 13 which is adapted when rotated to adjust the contact 10 in one direction or the other along the resistances 9 depending upon the direction of rotation thereof so that when the motor 11 is energized for rotation as a result of a change in the electromotive force developed by thermocouple 2, the motor will effect an adjusting movement of the contact 10 along the resistances 9 in the proper direction until the potentiometer circuit is again rebalanced. The unbalance current flow through galvanometer 6 will then be reduced to zero and the latter will return to its normal undeflected position whereupon the motor 11 will come to rest with the contact 10 at a new position along resistors 9, which position will then be a measure of the temperature of the interior of furnace 1.

If desired a pen may be mounted on the carriage which carries the potentiometer contact 10 and arranged in cooperative relation with a recorder chart 13a to thereby provide a continuous record of the temperature of the interior of furnace 1. The chart 13a may be a strip chart as shown and is adapted to be driven in any convenient manner as, for example, by a unidirectional motor 13b through suitable gearing (not shown) so that a record of the temperature to which the thermocouple 2 is subjected will be recorded as a continuous line on the chart. It will be apparent that, if desired, a chart of the circular type may be employed in lieu of the strip chart 13a.

As will be apparent, when the potentiometric network is rebalanced at a fast rate of speed the galvanometer position will lag behind the position of the contact 10 so that the position of the galvanometer will not indicate the balanced condition until after contact 10 has moved past the proper position of balanced. As a result when the galvanometer finally gets to its normal, undeflected position the potentiometric unbalance will be reversed and a hunting or oscillating action will be set up.

In order that the speed of motor 11 may be as great as possible during rebalancing without overshooting of the balance point and consequent hunting taking place, I have provided means to ensure that the motor speed and the rate of change of its speed is substantially proportional to the extent of potentiometric unbalance. Such means are desirable unless the motor has a suitable damping characteristic of its own. It is to this phase of the operation of high speed recorders and/or controllers that my present invention is particularly concerned.

As illustrated in Fig. 2, shield 73 is adapted to partially cover the opening 74 in shield 72, and is pivoted for rotation at its upper end on a shaft 76 which, in turn, is supported by and extends vertically from a stationary plate 77. A rod 78 of magnetic material is connected by an adjustable screw 79 at a point intermediate its ends to the lower end of shield 73. If desired, only a short section of each end of rod 78 may be of magnetic material and the intermediate portion a material having substantially less weight. The right end of rod 78 is inserted in solenoid 60 and is movable into and out of said solenoid in accordance with the energization of the latter. Similarly, the other end of rod 78 is inserted in solenoid 64 and is movable into and out of said solenoid in accordance with the energization of the latter. Solenoids 60 and 64 are supported by the plate 77 through bimetallic strips 61 and 65, respectively, each of which have one end rigidly connected by screw means 80 and 81 to the plate 77, and carry a respective solenoid 60 and 64 at its other end. Solenoids 60 and 64 are provided with adjustable screws 82 and 83, respectively, for limiting the axial movement of the rod 78.

When the solenoids 60 and 64 are deenergized, shield 73 is normally maintained in such a position with respect to galvanometer mirror 7 and photoelectric cell 12 that when the galvanometer is in its normal, undeflected position, part of the light reflected from mirror 7 toward photoelectric cell 12 is intercepted thereby and the remainder of the light impinges on said cell. This is the normal equilibrium condition of the system and the energizing current then supplied the motor 11 is the proper value to maintain the latter in a stationary condition. The means by which the shield 73 is maintained in this normal position comprises a spring release mechanism illustrated more or less diagrammatically in Fig. 4 and disclosed and claimed in my copending application Serial No. 194,583, filed March 8, 1938, for Pen release mechanism, issued into Patent No. 2,203,057 on June 4, 1940. A characteristic of this spring release mechanism is that all lost motion is eliminated and the force needed to move the shield 73 clockwise about the shaft 76 is exactly equal to the force required to move it counter-clockwise thereabout.

As shown in Fig. 4, lever 73 is resiliently connected to an arm 86 which is pivoted for rotation at a point intermediate its end on the shaft 76 and is spaced a suitable distance from the plate 77 by collar 88. This resilient connection consists of a spring 89 having a loop 90 which extends over a pin 91 carried on the upper end of arm 86. The opposite ends of the spring are wound around a bushing 92 which is carried by the shaft 76 and held in place by the collar 88 and a second collar 93, each of which are provided with a set screw. One end 94 of the spring 89 has hook 95 formed on its end to engage the side of shield 73 as seen in Fig. 4. The other end of the spring has a bent end 97 that overlies the front of an offset portion 98 of arm 86 and the lower end of lever 73. The coiled portion of spring 89 to the right of loop 90 has twice as many turns as the coiled portion of spring 89 to the left of loop 90 whereby the force of the last mentioned spring portion is exactly twice that of the former. Thus, with this arrangement it will require a force of one unit to rotate the shield 73 in a counter-clockwise direction, that is, the force required to overcome the action of the right end portion of the spring, and it will also require a force of one unit to rotate the shield 73 in a clockwise direction because although the left end portion of the spring exerts two units of force, one unit thereof is supplied by the right end portion of the spring which tends to produce clockwise motion of lever 73. Since the left end portion of the spring is stronger than the right end portion, the shield 73 will normally be maintained in a position wherein the bent portion 97 of the spring is in engagement with the arm 86 and said shield. This is the normal position of the shield 73.

As noted hereinbefore, solenoid 60 and bimetallic strip 61 are connected in circuit with the motor winding 58 and solenoid 64 and bimetallic strip 65 are connected in circuit with the motor winding 62. It will be clear that when the electronic valves 45 and 46 are equally conductive, the solenoids 60 and 64 will be equally energized and as a result the total force exerted by the solenoids 60 and 64 on the rod 78, carried by the lower end of shield 73, will be zero. The shield 73 will then be maintained in its normal position by the spring release mechanism described above whereby the light impinging on the photoelectric cell will be precisely that value required to maintain the system in a state of equilibrium.

When the conductivity of one valve 45 or 46 is increased or decreased with respect to the conductivity of the other valve, however, the energization of one solenoid 60 or 64 will be correspondingly increased or decreased with respect to the energization of the other, and accordingly, the shield 73 will tend to be deflected in a corresponding direction. The extent to which the shield 73 is so deflected is limited by the stop 82 or 83.

By properly relating the direction of deflection of shield 73 and the direction of deflection from its normal position of the light beam reflected by the galvanometer mirror 7 towards photoelectric cell 12, it will be apparent that when motor 11 is energized due to galvanometer mirror deflection, the shield 73 will be moved in the same direction that the light beam was deflected to thereby restore the normal relationship between photoelectric cell 12, shield 73, and the light beam, and to nullify the effect of such mirror deflection. The normal photoelectric cell illumination having thus been restored, the motor 11 will be deenergized for rotation.

The solenoid 60 or 64 which produced the deflection of shield 73 will be simultaneously deenergized, and as a result, the spring release mechanism described hereinbefore will return the shield 73 to its normal position whereby the galvanometer mirror deflection will again be effective to change the illumination of photoelectric cell 13 and cause rotation of motor 11. Deflection of shield 73 will again result and cause the energizing circuit to motor 11 to be interrupted whereby shield 73 will again return to its normal position. This action continues until the potentiometric network 5 is rebalanced and mirror 7 has assumed its normal position.

By so interrupting the energizing current to motor 11, it will be apparent that the latter will not be permitted to coast beyond the position wherein the potentiometric network is balanced, but will come to rest precisely at that position. It will be noted that if the potentiometric network is appreciably unbalanced, mirror 7 will be deflected to a relatively great extent, and the interruptions of the motor circuit will not occur so often because of the greater deflection of shield 73 required. Moreover, by properly adjusting the various instrument parts, it will be apparent that such interruptions need not occur at all when the deflection of mirror 7 is great thereby permitting motor 11 to run at full speed in rebalancing the potentiometric network. As the potentiometric balance point is approached, however, the interruptions of the motor energizing circuit will become more numerous whereby the motor speed will be reduced and the latter will come to rest with potentiometer contact 10 at the exact balance point along resistors 9.

Thus, on an appreciable change in temperature in furnace 1, motor 11 will be continuously energized and effect rapid adjustment of contact 10 along resistors 9 until the thermocouple E. M. F. is almost balanced, and as the balanced position is approached, the energization of motor 11 will be interrupted to cause a reduction in motor speed and stopping of the motor at the exact balance point.

In accordance with my invention I further provide means for slowly controlling the deflection of the shield 73 in accordance with the duration of the energization of motor 11. As will be apparent to those skilled in the art, it is desirable to provide such means inasmuch as the tendency of the rebalancing motor 11 to overshoot the balance point is greater on the occurrence of a large unbalance in the potentiometric network 5 than on a smaller unbalance thereof. The means by which this desirable effect is obtained includes the bimetallic strips 61 and 65 which, as will be noted, conduct the electrical current flow which produces energization of the motor 11 and actuation of the solenoids 60 or 64. The flow of this current through the resistance presented by said bimetallic strips is effective to increase the temperature and thereby to produce warping of said strips. The bimetallic strips are so arranged with respect to the remainder of the circuit elements that the direction of such warping is in the same direction as the motion of shield 73 produced by the solenoid then energized. It will be apparent the extent of such warping is a function of the duration of the motor energization, that is, the amount of warping will be small when the time of motor energization is short and will be larger when the time of motor energization is larger. The effect of the bimetallic strips 61 and 65 therefore is to increase the permissible deflection of shield 73 in accordance with the duration of the energization of motor 11 and thereby to cause the interruption of the energization of motor 11 at an earlier point in the potentiometer rebalancing adjustment operation determined by the length of time the motor 11 has been energized for rotation.

It will be apparent that motor 11 may be employed to operate a control valve or a rheostat for governing the application of an agent to a furnace for producing heat, for example, for which the thermocouple 2 is responsive, or another motor desirably operated together with motor 11 may be so employed. For example, as shown in Fig. 5, a furnace 1 to the temperature of which thermocouple 2 is responsive, is heated by a resistor 98 which is connected to electric supply conductors L³ and L⁴ through a rheostat 99 the adjustment of which is effected by a motor 100. The motor 100 may be exactly like motor 11 and connected by conductors (not shown) in parallel therewith. The mechanical connection of the rheostat 99 to the motor 100 is such as to decrease and increase the supply of electric current to resistor 98 as the temperature of furnace 1 rises above or drops below a predetermined level.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. In measuring apparatus including a light sensitive device, means for impinging a beam of light on said light sensitive device, means for producing deflections of said light beam from a predetermined normal position in accordance with variations from a predetermined value in a condition to be measured, a movable shield interposed between said impinging means and said light sensitive device, and means under control of said light sensitive device to control said second mentioned means to reduce the deflections of said beam from said normal position, the combination with said control means of means actuated simultaneously with said control means to rapidly move said shield relatively to said light sensitive device to temporarily reduce the effect of deflections of said light beam from said predetermined, normal position, and means actuated simultaneously with said control means to slowly move said shield in the same direction.

2. In measuring apparatus including a light sensitive device, means for impinging a beam of light on said light sensitive device, means for producing deflections of said light beam from a predetermined normal position in accordance with variations from a predetermined value in a condition to be measured, a movable shield interposed between said impinging means and said light sensitive device, motor means to reduce the deflections of said light beam from said normal position, electronic amplifying means having an input circuit and an output circuit, a connection between said light sensitive device and the input circuit of said electronic amplifying means, and a connection between said motor means and the output circuit of said electronic amplifying means, the combination with said motor means of means connected in the output circuit of said electronic amplifying means to rapidly move said shield relatively to said light sensitive device to temporarily reduce the effect of deflections of said light beam from said predetermined, normal position, and means connected in the output circuit of said electronic amplifying means to slowly move said shield in the same direction.

3. In measuring apparatus including a light sensitive device, means for impinging a beam of light on said light sensitive device, means for producing deflections of said light beam from a predetermined normal position in accordance with variations from a predetermined value in a condition to be measured, a movable shield interposed between said impinging means and said light sensitive device, motor means to reduce the deflections of said light beam from said normal position, electronic amplifying means having an input circuit and an output circuit, a connection between said light sensitive device and the input circuit of said electronic amplifying means, and a connection between said motor means and the output circuit of said electronic amplifying means, the combination with said motor means of solenoid means connected in the output circuit of said electronic amplifying means, a magnetic member carried by said shield and disposed in cooperative relation with said solenoid means whereby said shield is moved in accordance with the energization of said solenoid means, and current responsive means movable in accordance with a function of the energization of said motor means to support said solenoid means and adapted thereby to effect an additional adjustment in the position of said shield.

4. In measuring apparatus including a light sensitive device, means for impinging a beam of light on said light sensitive device, means for producing deflections of said light sensitive beam from a predetermined normal position in accordance with variations from a predetermined value in a condition to be measured, a movable shield interposed between said impinging means and said light sensitive device, motor means having two opposed energizing windings to reduce the deflections of said light beam from said normal position, and electronic amplifying means having an input circuit to which said light sensitive device is connected and an output circuit to which said opposed motor means windings are connected in pushpull, the combination with said motor means of a solenoid connected in circuit with each of said motor windings, a magnetic member carried by said shield and disposed in cooperative relation with each of said solenoids, and separate current responsive devices to support each of said solenoids and movable from a predetermined position in accordance with a function of the energization of said motor windings.

5. The combination of claim 4 wherein said current responsive devices are movable from a predetermined position in accordance with the length of time said motor means windings are energized to produce a reduction in the deflection of said light beam from said normal position.

6. The combination of claim 4 wherein said current responsive devices each comprise a bimetallic strip having one end rigidly supported and the other end connected to a respective solenoid.

7. In measuring apparatus including a light sensitive device, means for impinging a beam of light on said light sensitive device, means for producing deflections of said light sensitive beam from a predetermined normal position in accordance with variations from a predetermined value in a condition to be measured, a movable shield interposed between said impinging means and said light sensitive device, motor means having two opposed energizing windings to reduce the deflections of said light beam from said normal position, and electronic amplifying means having an input circuit to which said light sensitive device is connected and an output circuit to which said opposed motor means windings are connected in pushpull, the combination with said motor means of a solenoid connected in circuit with each of said motor windings, and a magnetic member carried by said shield and disposed in cooperative relation with each of said solenoids.

8. In control apparatus including a light sensitive device, means for subjecting said light sensitive device to a beam of light which has a predetermined normal position with respect to said light sensitive device but is deflectable from said predetermined normal position in accordance with the variations in a control quantity, a movable shield interposed in the path of said light beam, and means under control of said light sensitive device adapted on a change in said control quantity to produce a control effect tending to neutralize said change, the combination with said control means of means actuated simultaneously with said control means to rapidly move said shield relatively to said light sensitive device to temporarily reduce the effect of deflections of said light beam from said predetermined normal position, and means actuated simultaneously with said last mentioned means to slowly move said shield in the same direction.

9. In measuring apparatus including a light sensitive device, means for impinging a beam of light on said light sensitive device, means for producing deflections of said light beam from a predetermined normal position in accordance with variations from a predetermined value in a condition to be measured, a movable shield interposed between said impinging means and said light sensitive device, and motor means having two opposed windings which are adapted to be selectively energized under control of said light sensitive device to reduce the deflections of said light beam from said normal position, the combination with said motor means of a solenoid connected in circuit with each of said motor windings and adapted to be energized in accordance with the extent to which the associated motor winding is energized, and a magnetic member carried by said shield and disposed in cooperative relation with each of said solenoids.

10. In measuring apparatus including a light sensitive device, means for impinging a beam of light on said light sensitive device, means for producing deflections of said light beam from a predetermined normal position in accordance with variations from a predetermined value in a condition to be measured, a movable shield interposed between said impinging means and said light sensitive device, and motor means having two opposed windings which are adapted to be selectively energized under control of said light sensitive device to reduce the deflections of said light beam from said normal position, the combination with said motor means of a solenoid connected in circuit with each of said motor windings and adapted to be energized in accordance with the extent to which the associated motor winding is energized, a magnetic member carried by said shield and so disposed in cooperative relation with each of said solenoids that said shield is moved in one direction or the other when one of said solenoids is energized to an extent greater than the other, and means associated with and actuated simultaneously with said solenoids to effect an additional adjustment of the position of said shield.

11. In a normally balanced electrical network adapted to be unbalanced in accordance with variations in a variable condition to be measured and adapted to be rebalanced on unbalance thereof, a light sensitive device, means for impinging a beam of light on said light sensitive device, means for producing deflections of said light beam in one direction or the other from a predetermined normal position in accordance with the direction of unbalance of said network, a movable shield interposed between said impinging means and said light sensitive device, means to rebalance said network upon unbalance thereof, and means under control of said light sensitive device to control said rebalancing means and thereby to reduce the deflections of said beam from said normal position, the combination with said rebalancing means of means actuated simultaneously with said control means to rapidly move said shield relatively to said light sensitive device to temporarily reduce the effect of deflections of said light beam from said predetermined, normal position, and means actuated simultaneously with said control means to slowly move said shield in the same direction.

12. In a self balancing measuring instrument comprising measuring circuit means including a resistor and a contact engaging said resistor, said contact and resistor being relatively adjustable to vary the point along the length of said resistor at which the latter is engaged by the contact, reversible electrical motor means to relatively adjust said contact and resistor to thereby adjust their point of engagement along the length of said resistor in one direction or the other, and a device adapted to be connected to said circuit and to a source of variable electromotive force to respond to changes in said electromotive force, and adapted to be actuated on each such response in a direction and to an extent selectively dependent on the direction and extent of the corresponding change in said electromotive force, and control means through which said device is adapted when actuated to energize said motor means for operation in a direction and to an extent selectively dependent upon the direction and extent of said actuation, said control means including a light sensitive device, means for impinging a beam of light on said light sensitive device, means controlled by said device for producing deflections of said light beam in one direction or the other from a predetermined normal position in accordance with the actuation of said device, a movable shield interposed between said impinging means and said light sensitive device, and means under control of said light sensitive device to control said motor means, and thereby to reduce the deflections of said beam from said normal position, the combination with said motor means of means actuated simultaneously with said control means to rapidly move said shield relatively to said light sensitive device to temporarily reduce the effect of deflections of said light beam from said predetermined, normal position, and means actuated simultaneously with said control means to slowly move said shield in the same direction.

COLEMAN B. MOORE.